US011290547B2

United States Patent
Xu

(10) Patent No.: US 11,290,547 B2
(45) Date of Patent: Mar. 29, 2022

(54) SYSTEMS AND METHODS FOR DETERMINING AN OPTIMAL TRANSPORTATION SERVICE TYPE IN AN ONLINE TO OFFLINE SERVICE

(71) Applicant: BEIJING DIDI INFINITY TECHNOLOGY AND DEVELOPMENT CO., LTD., Beijing (CN)

(72) Inventor: Yang Xu, Beijing (CN)

(73) Assignee: BEIJING DIDI INFINITY TECHNOLOGY AND DEVELOPMENT CO., LTD., Beijing (CN)

(*) Notice: Subject to any disclaimer, the term of this patent is extended or adjusted under 35 U.S.C. 154(b) by 42 days.

(21) Appl. No.: 16/846,296

(22) Filed: Apr. 11, 2020

(65) Prior Publication Data

US 2020/0244744 A1 Jul. 30, 2020

Related U.S. Application Data

(63) Continuation of application No. PCT/CN2018/097160, filed on Jul. 26, 2018.

(30) Foreign Application Priority Data

Oct. 12, 2017 (CN) .......................... 201710949184.X

(51) Int. Cl.
*H04L 29/08* (2006.01)
*H04L 67/51* (2022.01)
(Continued)

(52) U.S. Cl.
CPC ............ *H04L 67/16* (2013.01); *G06Q 50/30* (2013.01); *G08G 1/202* (2013.01); *G08G 1/205* (2013.01);
(Continued)

(58) Field of Classification Search
CPC ......... H04L 67/04; H04L 67/16; H04L 67/18; H04L 69/329; H04W 4/02; H04W 28/06; G08G 1/202; G08G 1/205; G06Q 50/30
(Continued)

(56) References Cited

U.S. PATENT DOCUMENTS 9,230,292 B2   1/2016 Amin et al.
2004/0093280 A1* 5/2004 Yamaguchi ............ G07B 13/04
                                                    705/26.1
(Continued)

FOREIGN PATENT DOCUMENTS

CN      102110362 A    6/2011
CN      103699576 A    4/2014
(Continued)

OTHER PUBLICATIONS

International Search Report in PCT/CN2018/097160 dated Oct. 29, 2018, 5 pages.
(Continued)

*Primary Examiner* — Congvan Tran
(74) *Attorney, Agent, or Firm* — Metis IP LLC

(57) ABSTRACT

The present disclosure relates to a system and method for providing online to offline service to a user. The method may include determining, based on the service request signal, a plurality of different service types, each being associated with service information of the service type, and determining, based on the service request signal and a service selection model, an optimal service type; and generating, a response signal and transmit the response signal to the user terminal, wherein the response signal includes at least one frame encoding the service information of the optimal service type and a display command, and the display command is configured to prompt the first user terminal to display a first indicator related to the service information of (Continued)

the optimal service type according to a set of predetermined rules.

20 Claims, 8 Drawing Sheets

(51) Int. Cl.
*G06Q 50/30* (2012.01)
*G08G 1/00* (2006.01)
*H04L 67/04* (2022.01)
*H04L 67/52* (2022.01)
*H04L 69/329* (2022.01)
*H04W 4/02* (2018.01)
*H04W 28/06* (2009.01)

(52) U.S. Cl.
CPC .............. *H04L 67/04* (2013.01); *H04L 67/18* (2013.01); *H04L 69/329* (2013.01); *H04W 4/02* (2013.01); *H04W 28/06* (2013.01)

(58) Field of Classification Search
USPC ................................................. 370/328, 329
See application file for complete search history.

(56) References Cited

U.S. PATENT DOCUMENTS

| 2010/0107226 | A1* | 4/2010 | Grabelsky | H04L 63/102 |
| | | | | 726/4 |
| 2012/0232785 | A1 | 9/2012 | Wiesemann et al. | |
| 2013/0063613 | A1* | 3/2013 | Conwell | G06K 9/32 |
| | | | | 348/207.99 |
| 2016/0035009 | A1* | 2/2016 | Khrawish | G06Q 30/0259 |
| | | | | 705/7.15 |
| 2016/0117610 | A1* | 4/2016 | Ikeda | G06Q 10/02 |
| | | | | 705/5 |
| 2017/0220966 | A1 | 8/2017 | Wang | |
| 2017/0236407 | A1* | 8/2017 | Rhoads | G06K 9/6253 |
| | | | | 455/420 |
| 2018/0097705 | A1* | 4/2018 | Srivastava | H04L 43/08 |
| 2018/0158166 | A1* | 6/2018 | Tulabandhula | G06Q 50/30 |
| 2018/0336653 | A1* | 11/2018 | Levi | G06Q 50/30 |
| 2019/0019404 | A1 | 1/2019 | Ikeda et al. | |
| 2019/0166499 | A1* | 5/2019 | Asai | H04W 12/068 |

FOREIGN PATENT DOCUMENTS

| CN | 105115513 A | 12/2015 |
| CN | 105303817 A | 2/2016 |
| CN | 105973249 A | 9/2016 |
| CN | 106096000 A | 11/2016 |
| CN | 106156084 A | 11/2016 |
| CN | 106643771 A | 5/2017 |
| CN | 106679683 A | 5/2017 |
| CN | 106776900 A | 5/2017 |
| CN | 107025499 A | 8/2017 |
| CN | 107179087 A | 9/2017 |
| JP | 2016176903 A | 10/2016 |
| WO | 2011125059 A2 | 10/2011 |
| WO | 2015024807 A1 | 2/2015 |

OTHER PUBLICATIONS

Written Opinion in PCT/CN2018/097160 dated Oct. 29, 2018, 4 pages.
The Extended European Search Report in European Application No. 18866346.2 dated Aug. 3, 2020, 8 pages.
NNotice of Reasons for Rejection in Japanese Application No. 2020520791 dated Jun. 8, 2021, 8 pages.

* cited by examiner

SYSTEMS AND METHODS FOR DETERMINING AN OPTIMAL TRANSPORTATION SERVICE TYPE IN AN ONLINE TO OFFLINE SERVICE

CROSS-REFERENCE TO RELATED APPLICATIONS

This application is a Continuation of International Application No. PCT/CN2018/097160 filed on Jul. 26, 2018, which claims priority to Chinese Patent Application No. 201710949184.X filed on Oct. 12, 2017. The contents of above applications are incorporated herein by reference in their entirety.

TECHNICAL FIELD

The present disclosure generally relates to systems and methods for providing an online to offline service, and in particular, to systems and methods for determining an optimal transportation service type in an online to offline service.

BACKGROUND

Online to offline services, especially online to offline transportation (e.g., car hailing) services, have become more and more popular. A problem of the existing online to offline transportation services is that usually only one service type is provided when a user initiates a service request. For example, when a user requests a trip on an online to offline transportation platform, only one kind of transportation is provided. Accordingly, it is desirable to provide systems and methods for providing different service types to the user to choose.

SUMMARY

According to an aspect of the present disclosure, a system configured to provide online to offline service may include at least one non-transitory storage medium including a set of instructions; and at least one processor in communication with the at least one non-transitory storage medium. When executing the set of instructions, the at least one processor may be directed to: obtain a service request signal from a user terminal via wireless communication; determine, based on the service request signal, a plurality of different service types, each being associated with service information of the service type, and determine, based on the service request signal and a service selection model, an optimal service type; and generate a response signal and transmit the response signal to the user terminal. The response signal may include at least one frame encoding the service information of the optimal service type and a display command, and the display command is configured to prompt the first user terminal to display a first indicator related to the service information of the optimal service type according to a set of predetermined rules.

In some embodiments, the display command may be configured to display a characteristic string related to the plurality different service types on the user interface of the first user terminal.

In some embodiments, the response signal may further include at least one frame encoding partial of the plurality of service types not including the optimal service types, and the response signal may be further configured to: display the service information of the optimal service type in a first region of the user interface of the first terminal; display the service information of the other service types in a second region of the user interface of the first terminal.

In some embodiments, the first region may be larger than the second region.

In some embodiments, the first indicator may be located in the top of the user interface of the first terminal.

In some embodiments, the service request signal may include a departure location of a service request, and the display command may be determined based on the departure location.

In some embodiments, the display command may be determined based on a user input from the first user terminal.

In some embodiments, the service information of service type may include at least one of a charge standard, an estimated cost, a promotion, a current position of the vehicle, or an estimated waiting time.

In some embodiments, the service selection model may be related to at least one of an estimated cost, a promotion, a transportation service type commonly used by the user, a consumption level of the user, a number of nearby vehicles, or an estimated waiting time.

In some embodiments, the display command may be determined based on a difference between the service information of the optimal service type and service information of other service types.

According to another aspect of the present disclosure, a method implemented on at least one device, each of which has at least one processor and a storage medium, may include one or more of the following operations performed by the at least one processor. The method may include obtaining a service request signal from a user terminal via wireless communication; determining, based on the service request signal, a plurality of different service types, each being associated with service information of the service type; and determining, based on the service request signal and a service selection model, an optimal service type; and generating a response signal and transmit the response signal to the user terminal, wherein the response signal includes at least one frame encoding the service information of the optimal service type and a display command, and the display command is configured to prompt the first user terminal to display a first indicator related to the service information of the optimal service type according to a set of predetermined rules.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. The foregoing and other aspects of embodiments of present disclosure are made more evident in the following detail description, when read in conjunction with the attached drawing figures.

DETAILED DESCRIPTION

Figure 1:
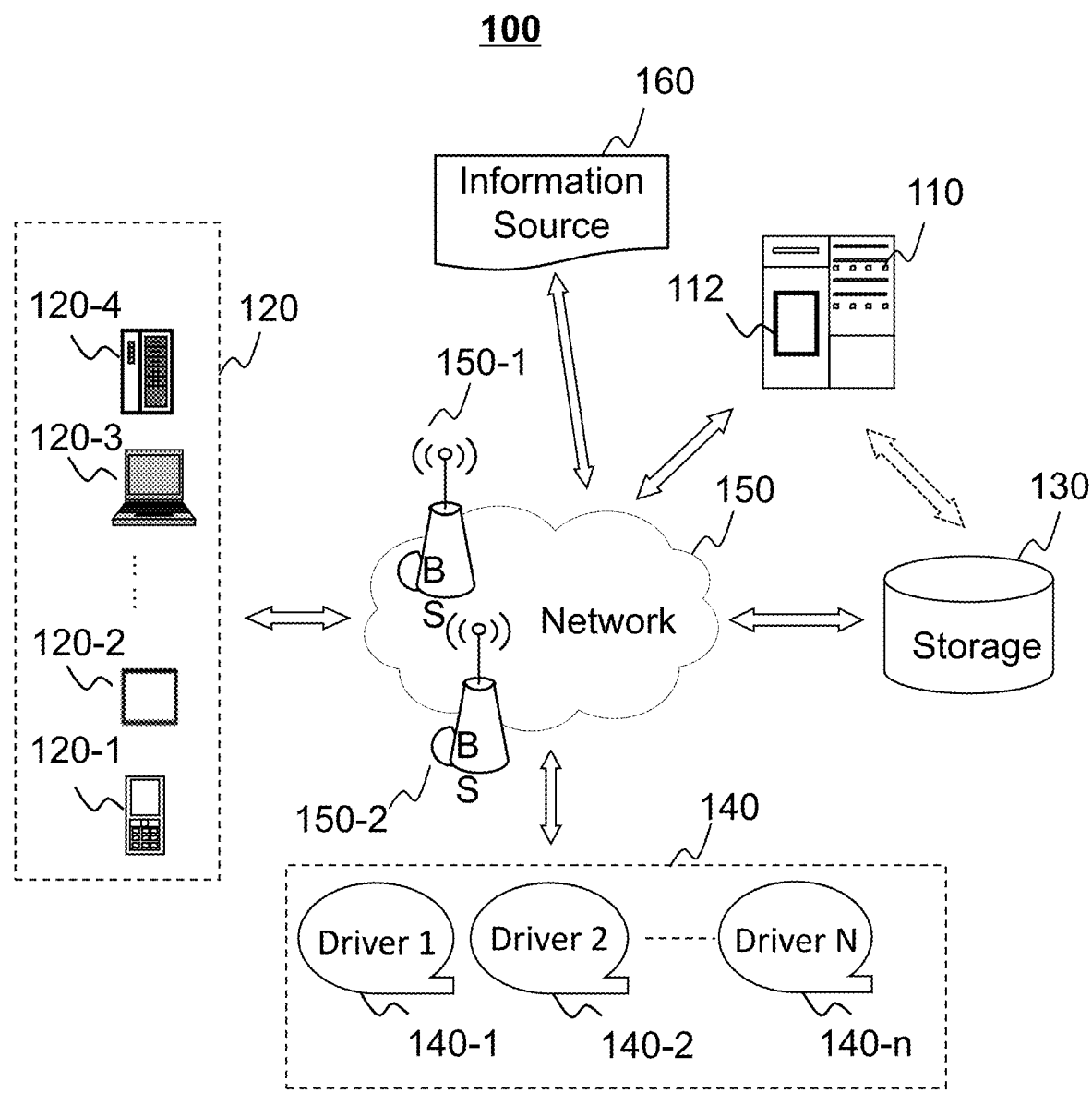
FIG. 1 is a block diagram of an exemplary system for determining and displaying an optimal transportation service type in on online to offline service according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowcharts may be implemented not in order. Conversely, the operations may be implemented in inverted order or simultaneously. Moreover, one or more other operations may be added to the flowcharts. One or more operations may be removed from the flowcharts.

Moreover, while the system and method in the present disclosure is described primarily in regard to online car hailing services, it should also be understood that this is only one exemplary embodiment. The system or method of the present disclosure may be applied to any other kind of online to offline service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The position and/or trace in the present disclosure may be acquired by positioning technology embedded in a user terminal (e.g., a passenger terminal, a driver terminal). The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (Wi-Fi) positioning technology, or the like, or any combination thereof. One or more of the above positioning technologies may be used interchangeably in the present disclosure.

An aspect of the present disclosure relates to a method and device for determine and display an optimal transportation service type. The method may include acquiring a user's travel request information, the request information may include an origin and a destination; acquiring service information of a plurality of transportation service types according to the travel request information; acquiring an optimal transportation service type based on preset selecting policy; displaying the service information of the optimal transportation service type and the remaining transportation service type respectively according to a predetermined display method. The present disclosure relates to acquiring the optimal transportation service type from a plurality of transportation service types, and displaying the service information of the optimal transportation service type and the remaining transportation service type respectively according to the predetermined display method. Thus, efficiency and accuracy of selecting the transportation service type for the user may be improved. The systems and methods here may also allow a communication (e.g., a dialog via predetermined choices, selections, and optimizations) between a server (e.g., at one processor) and a user's terminal device.

FIG. 1 is a block diagram of an exemplary system 100 for determining and displaying an optimal transportation service type in an online to offline service according to some embodiments of the present disclosure. For example, the system 100 may be an online transportation service platform for transportation services such as car hailing services, chauffeur services, vehicle delivery services, carpooling services, bus services, bullet train services, high speed rail services, subway services, vessel services, aircraft services, spaceship services, hot-air balloon services, driverless vehicle services, or the like, or any combination thereof driver hiring services, and shuttle services, etc. The system 100 may include a server 110, a passenger terminal 120, a storage 130, a driver terminal 140, a network 150 and an information source 160. The server 110 may include a processing engine 112.

The server 110 may be configured to process information and/or data relating to orders initiated by a plurality of service requesters, for example, orders for hailing cars. For example, the server 110 may receive a plurality of orders from the passenger terminals 120, and process the orders to allocate each order to a corresponding driver terminal 140 according to an allocating strategy. In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the passenger terminal 120, the driver terminal 140 and/or the storage 130 via the network 150. As another example, the server 110 may be directly connected to the passenger terminal 120, the driver terminal 140 and/or the storage 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device having one or more components illustrated in FIG. 2 in the present disclosure.

In some embodiments, the server 110 may include a processing engine 112. The processing engine 112 may process information and/or data relating to the orders initiated by a plurality of service requesters to perform one or more functions described in the present disclosure. For example, the processing engine 112 may obtain a plurality of orders from the passenger terminals 120, and process the orders to allocate each order to corresponding driver terminal 140 according to an allocating strategy. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

In some embodiments, the passenger terminal 120 and/or the driver terminal 140 may be an individual, a tool or other entity directly relating to the orders. A passenger may be a service requester. In the present disclosure, "service requester", "passenger terminal" and "passenger" may be used interchangeably. A driver may be a service provider. In the present disclosure, "driver," "driver terminal", and "service provider" may be used interchangeably. In some embodiments, the passenger terminal 120 may include a mobile device 120-1, a tablet computer 120-2, a laptop computer 120-3, and a built-in device 120-4 in a motor vehicle, or the like, or any combination thereof. In some embodiments, the mobile device 120-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a HoloLens, a Gear VR, etc. In some embodiments, built-in device in the motor vehicle 120-4 may include an onboard computer, an onboard television, etc. In some embodiments, the passenger terminal 120 may be a device with positioning technology for locating the position of the user and/or the passenger terminal 120.

The service provider terminal 140 may include a plurality of service provider terminals 140-1, 140-2, . . . , 140-n. In some embodiments, the driver terminal 140 may be similar to, or the same device as the passenger terminal 120. In some embodiments, the driver terminal 140 may be a device with positioning technology for locating the position of the driver and/or the driver terminal 140. In some embodiments, the passenger terminal 120 and/or the driver terminal 140 may communicate with another positioning device to determine the position of the user, the passenger terminal 120, the driver, and/or the driver terminal 140. In some embodiments, the passenger terminal 120 and/or the driver terminal 140 may transmit positioning information to the server 110.

The storage 130 may store data and/or instructions related to the orders. In some embodiments, the storage 130 may store data obtained/acquired from the passenger terminal 120 and/or the driver terminal 140. In some embodiments, the storage 130 may store data and/or instructions that the server 110 may execute or use to perform exemplary methods described in the present disclosure. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 130 may be connected to the network 150 to communicate with one or more components in the system 100 (e.g., the server 110, the passenger terminal 120, the driver terminal 140). One or more components in the system 100 may access the data or instructions stored in the storage 130 via the network 150. In some embodiments, the storage 130 may be directly connected to or communicate with one or more components in the system 100 (e.g., the server 110, the passenger terminal 120, the driver terminal 140, etc.). In some embodiments, the storage 130 may be part of the server 110.

The network 150 may facilitate exchange of information and/or data. In some embodiments, one or more components in the system 100 (e.g., the server 110, the passenger terminal 120, the storage 130, and the driver terminal 140) may send and/or receive information and/or data to/from other component(s) in the system 100 via the network 150. For example, the server 110 may obtain/acquire orders from the passenger terminals 120 via the network 150. In some embodiments, the network 150 may be any type of wired or wireless network, or combination thereof. Merely by way of example, the network 150 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee™ network, a near field communication (NFC) network, a global system for mobile communications (GSM) network, a code-division multiple access (CDMA) network, a time-division multiple access (TDMA) network, a general packet radio service (GPRS) network, an enhanced data rate for GSM evolution (EDGE) network, a wideband code division multiple access (WCDMA) network, a high speed downlink packet access (HSDPA) network, a long term evolution (LTE) network, a user datagram protocol (UDP) network, a transmission control protocol/Internet protocol (TCP/IP) network, a short message service (SMS) network, a wireless application protocol (WAP) network, a ultra wide band (UWB) network, an infrared ray, or the like, or any combination thereof. In some embodiments, the system 100 may include one or more network access points. For example, the system 110 may include wired or wireless network access points such as base stations and/or wireless access points 150-1, 150-2, . . . , through which one or more components of the system 100 may be connected to the network 150 to exchange data and/or information.

The information source 160 may be a source configured to provide other information for the system 100. The information source 160 may provide the system 100 with service information, such as weather conditions, transportation information, information of laws and regulations, news events, life information, life guide information, or the like. The information source 160 may be implemented in a single central server, multiple servers connected via a communication link, or multiple personal devices. When the information source 160 is implemented in multiple personal devices, the personal devices can generate content (e.g., as referred to as the "user-generated content"), for example, by uploading text, voice, image and video to a cloud server. An information source may be generated by the multiple personal devices and the cloud server.

Figure 2:
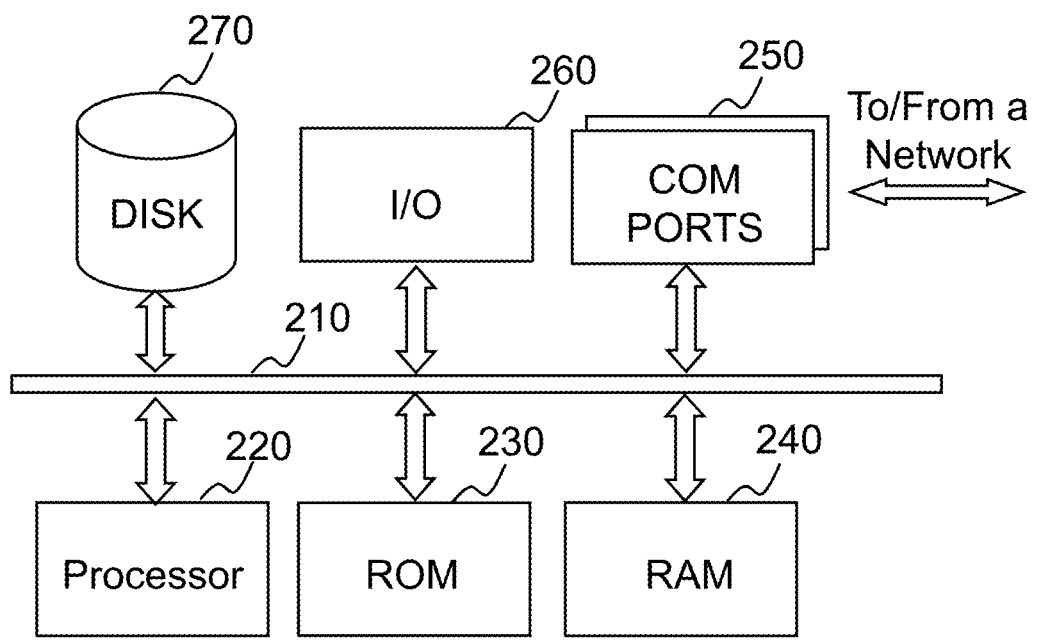
FIG. 2 is a schematic diagram illustrating exemplary hardware and/or software components of a computing device according to some embodiments of the present disclosure.

FIG. 2 is a schematic diagram illustrating exemplary hardware and software components of a computing device 200 on which the server 110, the passenger terminal 120, the storage 130, the driver 140 and/or the information source 160 may be implemented according to some embodiments of the present disclosure. The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the system 100 as described herein. In FIGS. 1-2, only one such computer device is shown purely for convenience purposes. One of ordinary skill in the art would understood at the time of filing of this application that the computer functions relating to the online to offline service as described herein may be implemented in a distributed fashion on a number of similar platforms, to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The exemplary computing device may include the internal communication bus 210, program storage and data storage of different forms including, for example, a disk 270, and a read only memory (ROM) 230, or a random access memory (RAM) 240, for various data files to be processed and/or transmitted by the computing device. The exemplary computing device may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
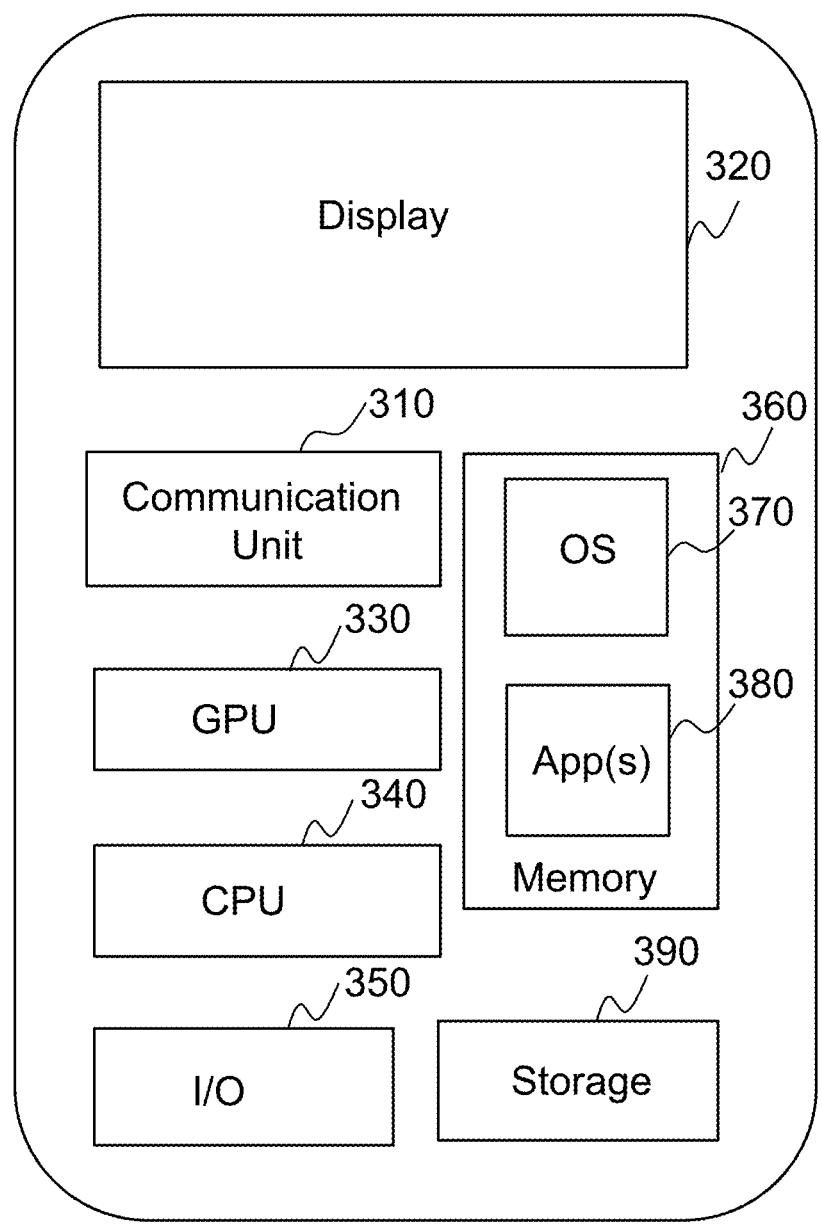
FIG. 3 is schematic diagram illustrating exemplary hardware and/or software components of a mobile device according to some embodiments of the present disclosure.

FIG. 3 is a schematic diagram illustrating exemplary hardware and/or software components of an exemplary mobile device 300 on which the passenger terminal 120 or the provider terminal 140 may be implemented according to some embodiments of the present disclosure. As illustrated in FIG. 3, the mobile device 300 may include a communication unit 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, ANDROID™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the location based service providing system on the mobile device 300. User interactions with the information stream may be achieved via the I/O devices 350 and provided to the processing engine 112 and/or other components of the system 100 via the network 120.

In order to implement various modules, units and their functions described above, a computer hardware platform may be used as hardware platforms of one or more elements (e.g., a module of the sever 110 described in FIG. 1). Since these hardware elements, operating systems, and program languages are common, it may be assumed that persons skilled in the art may be familiar with these technologies and they may be able to provide information required in the route planning according to the technologies described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
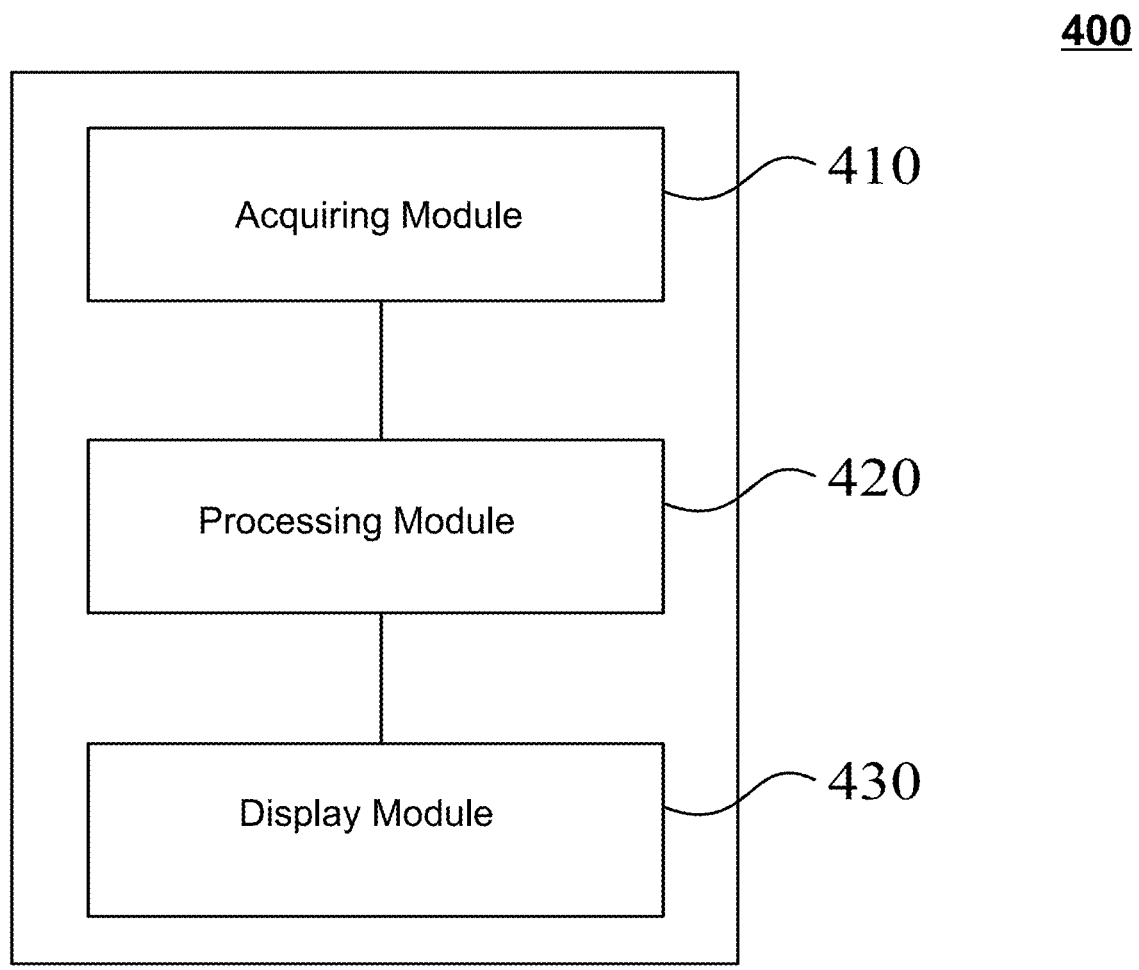
FIG. 4 is a block diagram illustrating an exemplary processing engine according to some embodiments of the present disclosure.

FIG. 4 is a block diagram illustrating an exemplary processing engine 112 according to some embodiments of the present invention. The processing engine 112 may include an acquiring module 410, a processing module 420, and a display module 460. Each, part, or all of the modules may be hardware circuits of all or part of the processing engine 112. Each, part, or all of the modules may also be implemented as an application or a set of instructions read and executed by the processing engine. Further, the modules may be any combination of the hardware circuits and the application/instructions. For example, the modules may be the part of the processing engine 112 when the processing engine is executing the application/set of instructions.

The acquiring module 410 may obtain a service request signal from a user terminal via wireless communication. The service request signal may encode a service request of a user for requesting a vehicle to travel from a departure location to a destination location. The user may input the service request on a user terminal (e.g., the mobile device 300 illustrated in FIG. 3), and the user terminal may generate and transmit the service request signal via wireless communication (e.g., via the communication unit 310).

The processing module 420 may determine, based on the service request signal, a plurality of different transportation service types, each being associated with service information of the transportation service type. The processing module 420 may determine, based on the service request signal and a service selection model, an optimal transportation service type. The processing module 420 may determine a service selection model, and the service selection model may determine a selecting strategy for determining an optimal transportation service type among the plurality of transportation service types. The processing module 420 may use a historical service request, a plurality of historical transportation service types provided to the user corresponding to the historical service request, and a historical optimal transportation service type determined by the user among the plurality of historical transportation service types as a sample to train and generate the service selection model (or the selecting strategy).

The display module 430 may generate a response signal and transmit the response signal to the user terminal. The response signal may include at least one frame encoding the service information of the optimal service type. The response signal may further include at least one frame encoding a display command. The display command may be configured to prompt the user terminal to display a first indicator related to the service information of the optimal service type according to a set of predetermined rules.

Figure 5:
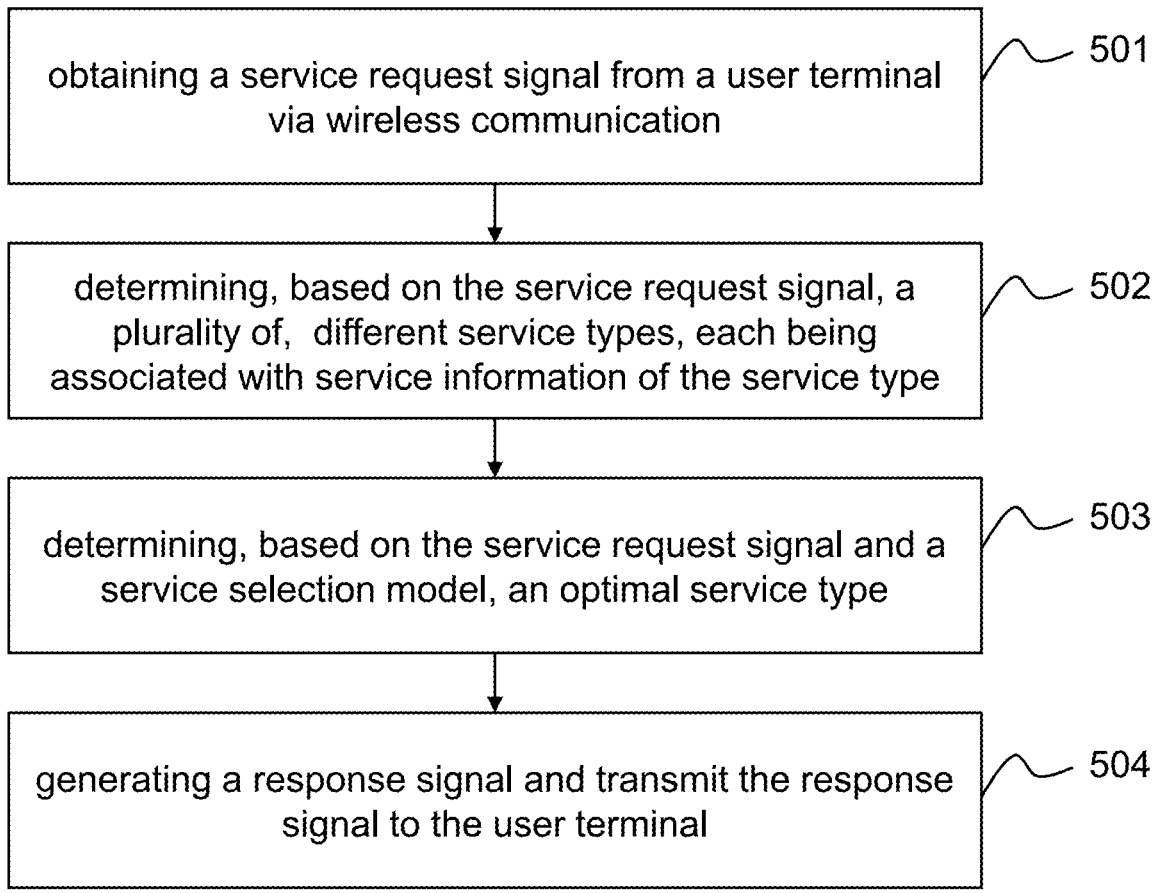
FIG. 5 is a flowchart of an exemplary process and/or method 500 for determining and displaying an optimal transportation service type according to some embodiments of the present disclose.

FIG. 5 is a flowchart of an exemplary process and/or method 500 for determining and displaying an optimal transportation service type according to some embodiments of the present disclose. In some embodiments, one or more steps in the process 500 may be implemented in the system 100 illustrated in FIG. 1. For example, one or more steps in the process 600 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In 501, the processor (e.g., the acquiring module 410) may obtain a service request signal from a user terminal via wireless communication. The service request signal may encode a service request of a user for requesting a vehicle to travel from a departure location to a destination location. The user may input the service request on a user terminal (e.g., the mobile device 300 illustrated in FIG. 3), and the user terminal may generate and transmit the service request signal via wireless communication (e.g., via the communication unit 310).

The service request, encoded by the service request signal, may include at least one of a departure location, a destination location, and/or a departure time. The user may input the service request via a keyboard of the user terminal (e.g., the I/O 350 of the mobile device 300 as illustrated in FIG. 3). In some embodiments, the user may input the departure location and/or the destination location via a map displayed by the user terminal (e.g., a map displayed by the display 320 of the mobile device 300 as illustrated in FIG. 3) in which the user can select the departure location and/or the destination location. In some embodiments, the user terminal may determine a current location of the user, obtained by the Global Positioning System (GPS), as the departure location, and obtain the destination location via user input. In some embodiments, the processor may provide some common destination locations for the user to select, such as a railway station, an airport, or a tourist attraction, or the like, or any combination thereof. In some embodiments, the service request may further include but not limited to a reservation time, a number of people involved in the travel, route information, traffic information, or the like, or any combination thereof.

In 502, the processor (e.g., the processing module 420) may determine, based on the service request signal, a plurality of different transportation service types, each being associated with service information of the transportation service type. A transportation service type may refer to a type of a transportation method provided by one or more suppliers or by the user that can move the user or make the user move from a location (e.g., the departure location, a certain location located between the departure location or the destination location, etc.) to another location (e.g., the destination location, or another certain location located between the departure location or the destination location, etc.) In some embodiments, the plurality of transportation service types may include but not limited to pedestrian navigation, taxi service, carpooling service, private car service, special picking up service, mini bus service, public transit bus service, subway service, shared bikes service, or the like, or any combination thereof. The processor (e.g., the processing module 420) may determine one or more transportation service types based on the service request. For instance, the processor may determine a plurality of transportation service types based on the service request, and each of the plurality of transportation service types may meet the demand of the user for travelling from the departure location to the destination location independently. The plurality of transportation service types may include a transportation service type which is the same as or different from another transportation service type of the plurality of transportation service types. For another instance, the processor (e.g., the processing module 420) may determine one or more transportation service types based on the service request to meet the demand of the user for travelling from the departure location to the destination location by combining the one or more transportation service types. The one or more transportation service types may include a transportation service type which is the same as or different from another service type of the one or more transportation service types.

A transportation service type may be associated with service information of the transportation service type. The service information of the transportation service type may include at least one of a charge standard (or fee standard, e.g., 2$/km), an estimated cost, a promotion, a current position of the vehicle, and/or an estimated waiting time. The service information of the transportation service type may be determined based on the service request. For instance, if the processor (e.g., the processing module 420) determines a transportation service type A (e.g., a bus service) based on the service request of a user for traveling from a departure location A to a destination B, the service information of the transportation service type A may include a charge standard of the transportation service type A from the departure location A to the destination location B, an estimated cost of the transportation service type A from the departure location A to the destination location B, and a current position of the vehicle providing the transportation service type A, or the like, or any combination thereof. If the processor (e.g., the processing module 420) determines one or more transportation service types based on the service request to meet the demand of the user for travelling from the departure location to the destination location by combining the one or more transportation service types, the service information of the transportation service type may further include a transfer location. For instance, if the processor (e.g., the processing module 420) determines a transportation service type A (e.g., a bus service) and a transportation service type B (e.g., a taxi service) based on the service request of a user for travel from a departure location A to a destination B, the service information of the transportation service type A may include a charge standard of the transportation service type A from the departure location A to a transfer location μl, an estimated cost of the transportation service type A from the departure location A to the transfer location μl, a current position of the vehicle providing the transportation service type A, and the service information of the transportation service type B may include a charge standard of the transportation service type B from the transfer location μl to the destination location B, an estimated cost of the transportation service type B from the transfer location μl to the destination location B, a current position of the vehicle providing the transportation service type B.

In 503, the processor (e.g., the processing module 420) may determine, based on the service request signal and a service selection model, an optimal transportation service type. The processor (e.g., the processing module 420) may determine a service selection model, and the service selection model may determine a selecting strategy for determining an optimal transportation service type among the plurality of transportation service types. The optimal transportation service type may be related to a tendency or a preference of the user that the user may choose a specific service type having the specific service information under a certain circumstance (e.g., the service request). The optimal transportation service type may be determined among the plurality of transportation service types based on the service selection model (or the selecting strategy). In some embodiments, the service selection model (or the selecting strategy) may be selecting the optimal transportation service type from the plurality of transportation service type based on at least one of the estimated cost, the promotions, a transportation service type commonly used by the user, a consumption level of the user, the numbers of nearby vehicles, or the estimated waiting time. For example, the service selection model (or the selecting strategy) may be configured to determine a transportation service type with the lowest estimated cost among the plurality of different transportation service types obtained in Operation 502 as the optimal service type. In some embodiments, a criterion of determining the optimal transportation service type may be inputted by the user as the service selection model (or the selecting strategy).

In some embodiments, the service selection model (or the selecting strategy) for determining the optimal service type may include a machine learning model. In some embodiments, the trained selection model may include one or more classifiers. Each of the classifiers may have a trained parameter related to the weight of the classifier. The processor (e.g., the processing module 420) may use a historical service request, a plurality of historical transportation service types provided to the user corresponding to the historical service request, and a historical optimal transportation service type determined by the user among the plurality of historical transportation service types as a sample to train and generate the service selection model (or the selecting strategy).

In some embodiments, the service selection model (or the selecting strategy) may be generated and/or trained in advance, and stored in a storage device (e.g., the storage 150). The processor may obtain the service selection model (or the selecting strategy) from the storage device. Alternatively or additionally, the service selection model (or the selecting strategy) may be trained and/or updated in real time. In some embodiments, the service selection model (or the selecting strategy) may be generated by performing one or more operations described in connection with FIG. 6.

The service selection model (or the selecting strategy) may be trained using one or more machine learning technologies. In some embodiments, the service selection model (or the selecting strategy) may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc.

In 504, the processor (e.g., the display module 430) may generate a response signal and transmit the response signal to the user terminal. The response signal may include at least one frame encoding the service information of the optimal service type. The response signal may further include at least one frame encoding a display command. The display command may be configured to prompt the user terminal to display a first indicator related to the service information of the optimal service type according to a set of predetermined rules. In some embodiments, the display command may be determined based on a user input from the user terminal.

The display command may be configured to display the service information of the optimal transportation service type without displaying service information of other transportation service types. For instance, the display command may be configured to display only the service information of the optimal transportation service type on the display 320 of the mobile device 300. In some embodiments, the display command may be configured to display the service information of the optimal transportation service type and the service information of other transportation service types in one graphic user interface (GUI). The display command may be configured to display the service information of the optimal transportation service type a first place of the GUI, while the service information of other transportation service types may be displayed after the service information of the optimal transportation service type. In some embodiments, the display command may be configured to display the service information of the optimal transportation service type and the service information of other transportation service types in a plurality of GUIs. The service information of the optimal transportation service type may be displayed in a first GUI, while the service information of other transportation service types may be displayed in one or more GUIs after the first GUI. The user may switch the plurality of GUIs to display respective content via sliding operation. For instance, the display command may be configured to display the service information of the optimal transportation service type in a first GUI displayed the display 320, and the user may touch and slide the display 320 with a finger by which a second GUI containing the service information of another service type may be displayed in the display 320.

In some embodiments, the service information of the optimal transportation service type and the service information of other transportation service types may be displayed in one graphic user interface (GUI). A display area of the GUI may be divided into a main-display area and a sub-display area. The main-display area may be larger than the sub-display area. The service information of the optimal transportation service type may be displayed in the main-display area. Part of the service information or a brief version of the service information of other transportation service types may be displayed in the sub-display area (e.g., the estimated cost, the estimated waiting time, etc.). Content of the service information displayed in the GUI may be determined by the user. In some embodiments, the display command may be configured to display a description (e.g., a character strings) related to the reason why other transportation service types are not determined as the optimal service type. For example, the description may be "the estimated cost is higher", or "the estimated waiting time is longer."

The processor (e.g., the display module 430) may generate the display command based on the departure location of the service request or the current location of the user. For instance, if the processor determines that the departure location of the service request or the current location of the user is a personnel distribution area (e.g., a bus station, a train station, an airport, etc.), the display command may be presented in a simple form, making it easier for the user to make a quick decision. In certain embodiments, the display command may be configured to display the service information of the optimal transportation service type without displaying service information of other transportation service types. It is helpful to have the capability of quickly disbursing people in the personnel distribution area. The processor (e.g., the display module 430) may generate the display command based on a difference between the service information of the optimal service type and service information of other service types. For example, if the difference between the service information of the optimal service type and service information of other service types is less than a predetermined threshold, the display command may be configured to display the service information of the optimal service type and service information of other service types.

The process 500 herein described can be used not only for an entire trip (from a departure location to a destination) requested by a user through a user terminal. In some embodiments, the process 500 can also be used for a segment of a trip. For example, after obtaining a service request signal from a user terminal via wireless communication, the processor may divide the trip requested by the user into multiple (i.e. two or more) segments. In some embodiments, the processor may utilize operations 502-503 to determine an optimal service type for each segment. In addition, the processor may utilize operation 504 to generate a response signal and transmit the response signal to the user terminal. In some embodiments, the response signal is related to one segment of the trip, and multiple response signals can be sent to the user terminal, each corresponding to one segment. The user terminal may be directed to display an indicator of the service information for the segment and display the corresponding indicators for the multiple segments one by one. In some embodiments, only one response signal is sent, and this response signal contains multiple optimal service types for the multiple segments of the trip. The multiple service types can be the same or can be different. In certain embodiments, the response signal from the processor include a complete trip plan, including multiple segments of the trip and optimal service types respectively corresponding to the multiple segments.

In some embodiments, the server and the user (through the user terminal) may engage in a dialog regarding the optimization of the trip. For example, the server may send a response signal to the user terminal, the response signal including a display command and a complete trip plan. The display command may be configured to prompt the terminal to display the trip plan, which includes multiple trip segments and multiple corresponding optimal service types. In certain embodiments, each service type is presented as an optimal (first and pre-select) choice among a number of choices (other service types). Service information (e.g. charge standards) of the service types may also be presented. The user, through the user terminal, may accept the trip plan as presented or change it by selecting, directly on the trip plan presented on the user terminal, other service types for one or more of the multiple segments. In some embodiments, the server may further provide reminders to the user, by sending the reminders to the user terminal, that the choices selected by the user, by changing the optimal plan, may result in much longer (e.g. causing additional travel time that is more than a threshold) trip time. The user, through the user terminal, may have another chance to finalize the trip plan.

It should be noted that the above descriptions of process 500 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. In some embodiments, one or more steps may be added or omitted.

Figure 6:
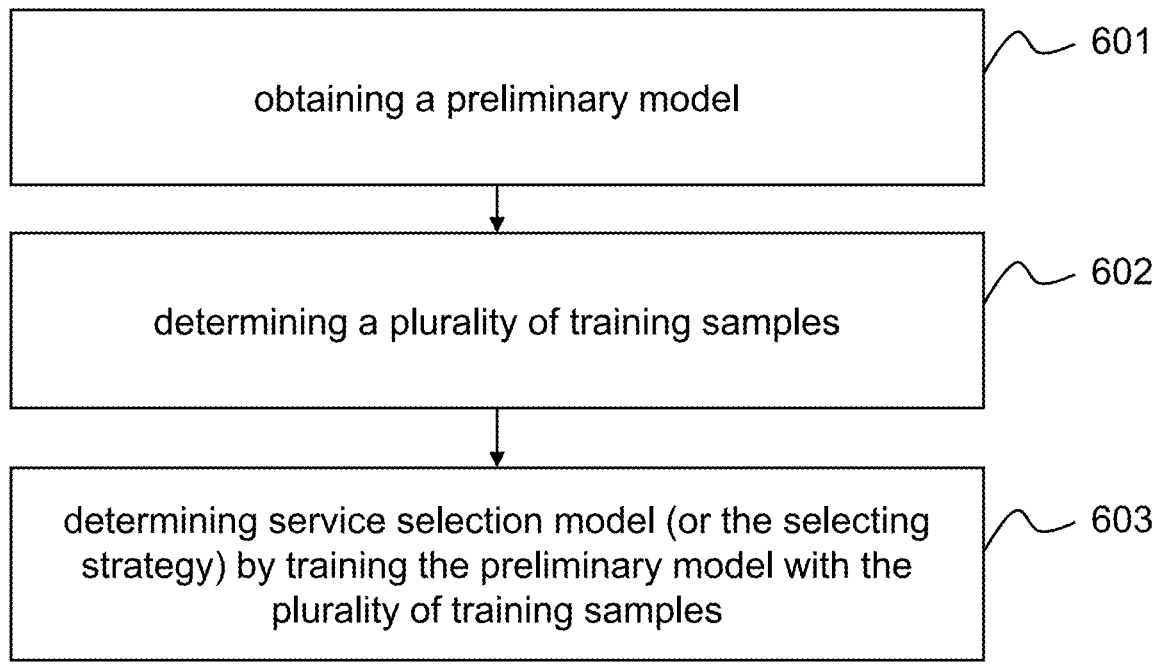
FIG. 6 is a flowchart of an exemplary process and/or method 600 for determining a service selection model (or the selecting strategy) according to some embodiments of the present disclosure.

FIG. 6 is a flowchart of an exemplary process and/or method 600 for determining a service selection model (or the selecting strategy) according to some embodiments of the present disclosure. In some embodiments, one or more steps in the process 600 may be implemented in the system 100 illustrated in FIG. 1. For example, one or more steps in the process 600 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In 601, the processor (e.g., the processing module 420) may obtain a preliminary model. In some embodiments, the preliminary model may include one or more classifiers. Each of the classifiers may have an initial parameter related to the weight of the classifier.

The preliminary model may include a Ranking Support Vector Machine (SVM) model, a Gradient Boosting Decision Tree (GBDT) model, a LambdaMART model, an adaptive boosting model, a recurrent neural network model, a convolutional network model, a hidden Markov model, a perceptron neural network model, a Hopfield network model, a self-organizing map (SOM), or a learning vector quantization (LVQ), or the like, or any combination thereof. The recurrent neural network model may include a long short term memory (LSTM) neural network model, a hierarchical recurrent neural network model, a bi-direction recurrent neural network model, a second-order recurrent neural network model, a fully recurrent network model, an echo state network model, a multiple timescales recurrent neural network (MTRNN) model, etc.

In 602, the processor (e.g., the processing module 420) may determine a plurality of training samples. A training sample may include a historical service request, a plurality of historical transportation service types provided to the user corresponding to the historical service request, and a historical optimal transportation service type determined by the user among the plurality of historical transportation service types. Besides, the processor (e.g., the processing module 420) may determine whether a training sample is a positive sample or a negative sample.

In 603, the processor (e.g., the processing module 420) may determine a service selection model (or the selecting strategy) by training the preliminary model with the plurality of training samples. More specifically, the preliminary model may take service information of the historical service request and service information of the plurality of historical transportation service types provided to the user corresponding to the historical service request as an input, and determine a simulated optimal transportation service type as the actual output based on the one or more classifiers. The historical service request may have one or more attributes, including at least one of a historical departure location, a historical destination location, and a historical departure time. The historical transportation service type may have one or more attributes, including least one of a charge standard, an estimated cost, a promotion, a current position of the vehicle, and an estimated waiting time. Each of the one or more classifiers may have an initial parameter related to the weight of the classifier. The initial parameter related to the weight of the classifier may be adjusted based on the positive and/or the negative samples.

The processor (e.g., the processing module 420) may determine a desired output based on the plurality of training samples. In some embodiments, the desired output of a training sample may be the historical optimal transportation service type determined by the user among the plurality of historical transportation service types. The processor (e.g., the processing module 420) may train the preliminary model to minimize a loss function. The loss function may indicate a difference between the desired output and the actual output determined by the preliminary model. A training sample may have an actual score of the actual output and a desired score of the desired output. The actual score and the desired score may be the same or different. The loss function may be a sum of the absolute differences between the actual score and the desired score for each of the training samples. Specifically, when the actual output is the same as the desired output, the loss function is 0. The minimization of the loss function may be iterative. The iteration of the minimization of the loss function may end when the value of the loss function is less than a predetermined threshold. The predetermined threshold may be set based on various factors, including a number of the training samples, the accuracy level of the model, etc. The processor (e.g., the processing module 420) may iteratively adjust the initial parameters of the preliminary model during the minimization of the loss function. At the end of the minimization of the loss function, the processor (e.g., the processing module 420) may determine more than one trained parameter and the service selection model (or the selecting strategy).

It should be noted that the above descriptions of process 600 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. In some embodiments, one or more steps may be added or omitted. For example, operations 601 and 602 may be merged into one step.

Figure 7:
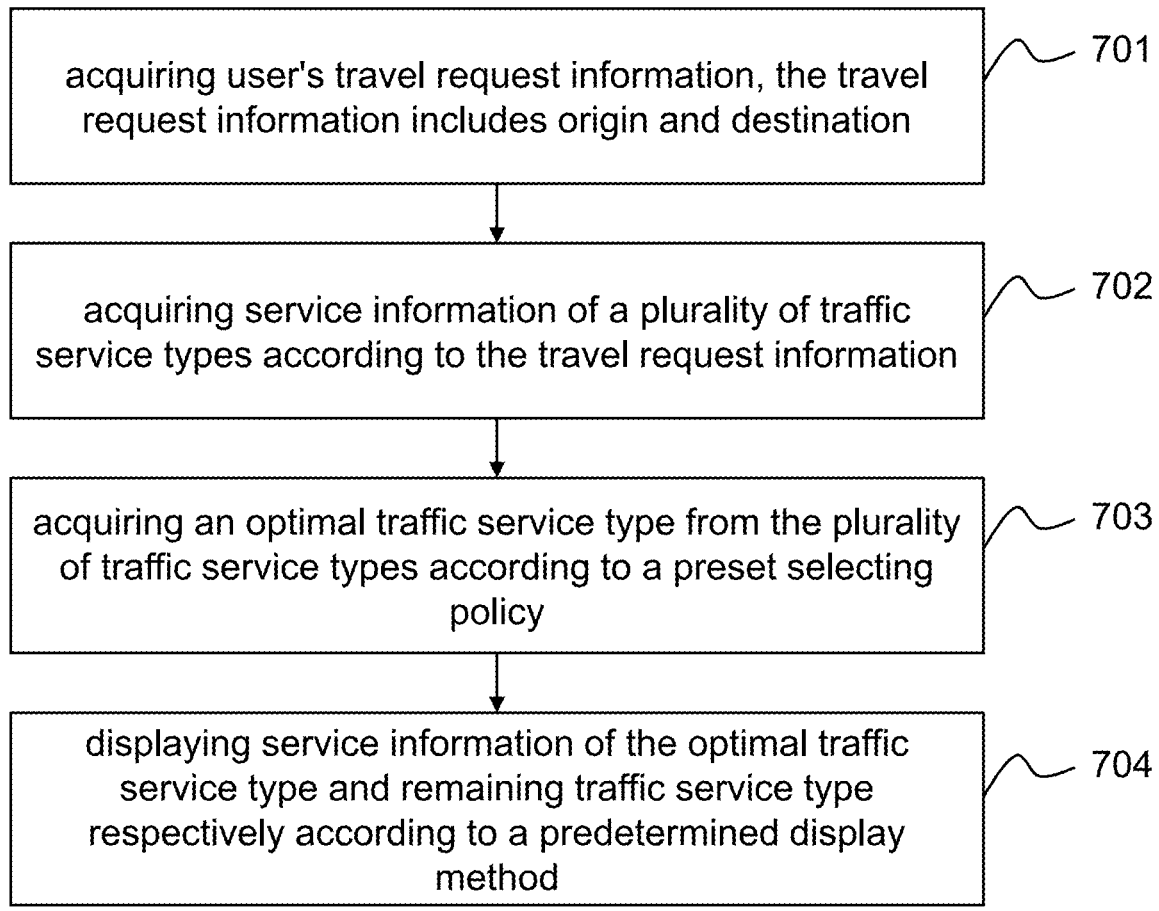
FIG. 7 is a flowchart of an exemplary process and/or method 700 for determining and displaying an optimal transportation service type according to some embodiments of the present disclose; and, FIG. 8 is a diagram illustrating an exemplary graphic user interface for determining displaying an optimal transportation service type according to some embodiments of the present disclose.

FIG. 7 is a flowchart of an exemplary process and/or method 700 for determining and displaying an optimal transportation service type according to some embodiments of the present disclose. In some embodiments, one or more steps in the process 700 may be implemented in the system 100 illustrated in FIG. 1. For example, one or more steps in the process 700 may be stored in the storage 130 and/or the storage (e.g., the ROM 230, the RAM 240, etc.) as a form of instructions, and invoked and/or executed by the server 110 (e.g., the processing engine 112 in the server 110, or the processor 220 of the processing engine 112 in the server 110).

In 701, a user's travel request information may be acquired. The travel request information may include a departure location and/or a destination location. The user may input the travel request information via a keyboard of the mobile terminal. In some embodiments, the user may input the travel request information via a map displayed by the mobile terminal in which the user can select the departure location and/or the destination location. In some embodiments, a current location of the user may be obtained by the Global Positioning System (GPS), as the departure location, and obtain the destination location via user input. Some common destination locations may be provided for the user to select, such as a railway station, an airport, or a tourist attraction. In some embodiments, the user's travel request information may further include but not limited to a reservation time, a number of people involved in the travel, route information, traffic information, or the like, or any combination thereof.

In 702, service information corresponding to a plurality of transportation service types may be acquired based on the travel request information. In some embodiments, the plurality of transportation service types may include but not limited to taxi service, carpooling service, private car service, special picking up service, mini bus service, public transit bus service, subway service, shared bikes service or the like, or any combination thereof. The service information of the transportation service type may include at least one of a charge standard, an estimated cost, a promotion, a current position of the vehicle, and an estimated waiting time. Service information may be acquired by employing arbitrary algorithm in the related art according to the travel request information, and is not repeatedly described here.

In 703, an optimal transportation service type may be determined among the plurality of transportation service types based on a preset selecting strategy. In some embodiments, the preset selecting strategy may be selecting the optimal transportation service type from the plurality of transportation service type based on at least one of the estimated cost, the promotions, a transportation service type commonly used by the user, a consumption level of the user, the numbers of nearby vehicles, and the estimated waiting time.

In some embodiments, a type of the acquired service information obtained in the operation 702 may be determined based on the preset selecting strategy in the operation 703. For instance, when the preset selecting strategy is selecting the optimal transportation service type from the plurality of transportation service types based on the estimated cost, service information corresponding to a plurality of transportation service types obtained in the operation 702 may be may be the charge standards, the estimated cost, the promotion of the plurality of transportation service types.

In 704, the service information of the optimal transportation service type and service information of other transportation service types may be displayed respectively according to a set of predetermined rules. Since the optimal transportation service type has been determined, the service information of the optimal transportation service type may be pushed to the user preferentially. Specifically, in some embodiments, the predetermined display rule may be displaying the service information of the optimal transportation service type without displaying service information of other transportation service types. In some embodiments, the predetermined display rule may be displaying the service information of the optimal transportation service type and the service information of other transportation service types in one graphic user interface (GUI). The service information of the optimal transportation service type may be displayed in a first place of the GUI, while the service information of other transportation service types may be displayed after the service information of the optimal transportation service type. In some embodiments, the service information of the optimal transportation service type and the service information of other transportation service types may be displayed in a plurality of GUIs. The service information of the optimal transportation service type may be displayed in a first GUI, while the service information of other transportation service types may be displayed in one or more GUIs after the first GUI. The user may switch the plurality of GUIs to display respective content via sliding operation. In some embodiments, the service information of the optimal transportation service type and the service information of other transportation service types may be displayed in one graphic user interface (GUI). A display area of the GUI may be divided into a main-display area and a sub-display area. The main-display area may be larger than the sub-display area. The service information of the optimal transportation service type may be displayed in the main-display area. Partial of the service information or a brief of the service information of other transportation service types may be displayed in the sub-display area (e.g., the estimated cost, the estimated waiting time, etc.). Content of the service information displayed in the GUI may be determined by the user.

The present disclosure provides following exemplary embodiments describing the predetermined display rule as illustrated in Operation 704. According to a first exemplary embodiment of the present disclosure, the service information of the optimal transportation service type may be displayed, while the service information of other transportation service types may be not displayed. It is convenient for a user to quickly select a transportation service type by only displaying the service information of the optimal transportation service type. Specifically, when the user is in a personnel distribution area (e.g., a bus station, a train station, an airport, etc.), it is helpful to have the capability of quickly disbursing people in such an area. Further, the predetermined display rule, described in this embodiments, may be more convenient for the user to focus on a certain aspect of the service information of the transportation service type. For example, for the user who only care about the estimated cost, the preset selecting strategy may be set to select the optimal transportation service type according to the estimated cost, and only the service information of the optimal transportation service type is displayed, by which the user may quickly select the transportation service type with the lowest estimated cost. In some embodiments, the predetermined display rule may further include displaying a description (e.g., a character strings) related to the reason why other transportation service types are not determined as the optimal service type. For example, the description may be "the estimated cost is higher", or "the estimated waiting time is longer."

Figure 8:
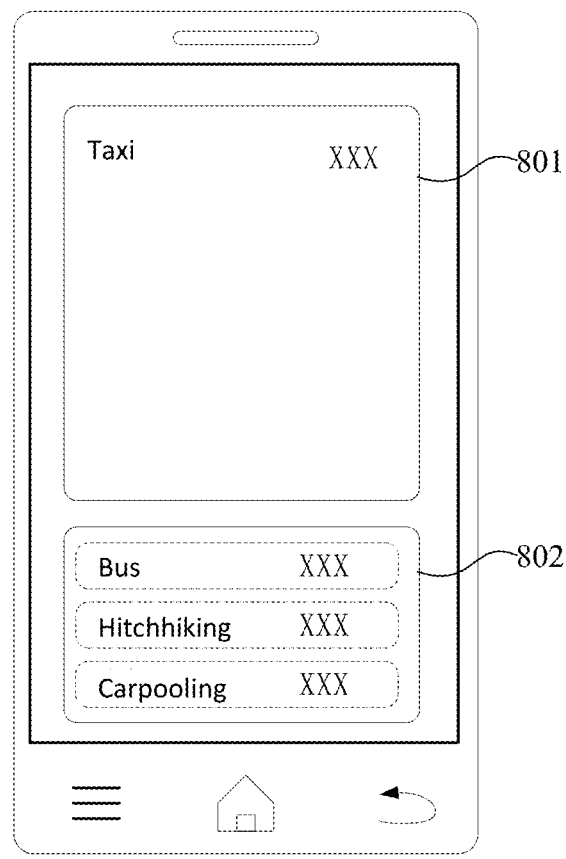

According to a second exemplary embodiment of the present disclosure, as illustrated in FIG. 8, a display area of a GUI may be divided into a main-display area 801 and a sub-display area 802. The service information of the optimal transportation service type may be displayed in the main-display area 801. The service information of other transportation service types may be displayed in the sub-display area 802. In some embodiments, the main-display area 801 is larger than the sub-display area 802. The service information displayed in the main-display area 801 may include at least one of a charge standard, an estimated cost, a promotion, a current position of the vehicle, and an estimated waiting time.

Partial of the service information of other transportation service types may be displayed in the sub-display area 802. Partial of the service information of the transportation service types may include one or more categories of the service information. In some embodiments, the partial of the service information of the transportation service types may further include advantage information of other transportation types, by which the user may understand other transportation types. In some embodiments, the number of the sub-display areas 802 may be more than one. For instance, each of the more than one sub-display area 802 may display partial of the service information of a transportation service type.

According to a third exemplary embodiment of the present disclosure, both the service information of the optimal transportation service type and the service information of other transportation service types may be displayed in the display area of the GUI. The service information of the optimal transportation service type may be displayed on the top of the display area of the GUI, and the service information of other transportation service types may be displayed below the optimal transportation service type, by which the user may get service information of all the transportation service types, thus the user may get the advantages and disadvantages of all the transportation service types. It is convenient for the user to select the transportation service type by displaying the optimal transportation service type on the top of the display area. In some embodiments, other transportation service types may be ordered according to a preset order rule. For example, the other transportation service types may be ordered according to the estimated cost. If the difference between the service information of the optimal service type and service information of other service types is less than a predetermined threshold, the display command may be configured to display the service information of the optimal service type and service information of other service types according to the second exemplary embodiment or the third exemplary embodiment of the present disclosure.

It should be noted that the above descriptions of process 700 are provided for the purposes of illustration, and not intended to limit the scope of the present disclosure. For persons having ordinary skills in the art, various modifications and changes in the forms and details of the application of the above method and system may occur without departing from the principles in the present disclosure. However, those variations and modifications also fall within the scope of the present disclosure. In some embodiments, one or more steps may be added or omitted. For example, Operations 701 and 702 may be merged into one step.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, one or more other optional steps (e.g., a storing step, a preprocessing step) may be added elsewhere in the exemplary process/method 900. As another example, all the steps in the exemplary process/method 900 may be implemented in a computer-readable medium including a set of instructions. The instructions may be transmitted in a form of electronic current or electrical signals.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by the present disclosure, and are within the spirit and scope of the exemplary embodiments of the present disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system configured to provide online to offline service to a user, comprising:
   at least one non-transitory storage medium including a set of instructions; and
   at least one processor in communication with the at least one non-transitory storage medium, wherein when executing the set of instructions, the at least one processor is directed to:
      obtain a service request signal from a user terminal via wireless communication;
      determine, based on the service request signal, a plurality of different service types, each being associated with service information of one of the service types;
      determine, based on the service request signal and a service selection model, an optimal service type among the plurality of different service types, wherein the service selection model is determined by training a preliminary model with a plurality of training samples; and
      generate a response signal and transmit the response signal to the user terminal,
         wherein the response signal includes at least one frame encoding the service information of the optimal service type and a display command, and
         the display command is configured to prompt the user terminal to display a first indicator related to the service information of the optimal service type according to a set of predetermined rules.

2. The system of claim 1, wherein the display command is configured to:
   display a characteristic string related to the plurality of different service types on a user interface of the user terminal.

3. The system of claim 1, wherein the response signal further includes at least one frame encoding partial of the plurality of service types not including the optimal service types, and the response signal is further configured to:
   display the service information of the optimal service type in a first region of the user interface of the user terminal;
   display the service information of other service types in a second region of the user interface of the user terminal.

4. The system of claim 3, wherein the first region is larger than the second region.

5. The system of claim 2, wherein the first indicator is located in the top of the user interface of the user terminal.

6. The system of claim 2, wherein the service request signal includes a departure location of a vehicle of a service request, and the display command is determined based on the departure location of the vehicle.

7. The system of claim 2, wherein the display command is determined based on a user input from the user terminal.

8. The system of claim 6, wherein the service information of service type includes at least one of a charge standard, an estimated cost, a promotion, a current position of the vehicle, or an estimated waiting time.

9. The system of claim 1, wherein the service selection model is related to at least one of an estimated cost, a promotion, a transportation service type commonly used by the user, a consumption level of the user, a number of nearby vehicles, or an estimated waiting time.

10. The system of claim 1, wherein the display command is determined based on a difference between the service information of the optimal service type and the service information of the other service types.

11. A method implemented on a computing device for providing online to offline service to a user, the computing device including a memory and one or more processors, the method comprising:
   obtaining a service request signal from a user terminal via wireless communication;
   determining, based on the service request signal, a plurality of different service types, each being associated with service information of one of the service types;
   determining, based on the service request signal and a service selection model, an optimal service type among the plurality of different service types, wherein the service selection model is determined by training a preliminary model with a plurality of training samples; and generating, a response signal and transmit the response signal to the user terminal,
wherein the response signal includes at least one frame encoding the service information of the optimal service type and a display command, and
the display command is configured to prompt the user terminal to display a first indicator related to the service information of the optimal service type according to a set of predetermined rules.

12. The method of claim 11, wherein the display command is configured to:
display a characteristic string related to the plurality of different service types on a user interface of the user terminal.

13. The method of claim 12, wherein the response signal further includes at least one frame encoding partial of the plurality of different service types not including the optimal service types, and the response signal is further configured to:
display the service information of the optimal service type in a first region of the user interface of the user terminal;
display the service information of the other service types in a second region of the user interface of the user terminal,
wherein the first region is larger than the second region.

14. The method of claim 12, wherein the first indicator is located in the top of the user interface of the user terminal.

15. The method of claim 12, wherein the service request signal includes a departure location of a vehicle of a service request, and the display command is determined based on the departure location of the vehicle.

16. The method of claim 12, wherein the display command is determined based on a user input from the user terminal.

17. The method of claim 15, wherein the service information of service type includes at least one of a charge standard, an estimated cost, a promotion, a current position of the vehicle, or an estimated waiting time.

18. The method of claim 11, wherein the service selection model is related to at least one of an estimated cost, a promotion, a transportation service type commonly used by the user, a consumption level of the user, a number of nearby vehicles, or an estimated waiting time.

19. The method of claim 11, wherein the display command is determined based on a difference between the service information of the optimal service type and service information of other service types.

20. A non-transitory computer readable medium embodying a computer program product, the computer program product comprising instructions configured to cause a computing device to:
obtain a service request signal from a user terminal via wireless communication;
determine, based on the service request signal, a plurality of different service types, each being associated with service information of one of the service types;
determine, based on the service request signal and a service selection model, an optimal service type among the plurality of different service types, wherein the service selection model is determined by training a preliminary model with a plurality of training samples; and
generate a response signal and transmit the response signal to the user terminal,
wherein the response signal includes at least one frame encoding the service information of the optimal service type and a display command, and
the display command is configured to prompt the user terminal to display a first indicator related to the service information of the optimal service type according to a set of predetermined rules.

* * * * *